(12) United States Patent
Shin et al.

(10) Patent No.: US 9,948,340 B2
(45) Date of Patent: Apr. 17, 2018

(54) WEARABLE MODULAR MOBILE DEVICE INCLUDING A ROTATABLE DISPLAY

(71) Applicant: LG ELECTRONICS INC., Seoul (KR)

(72) Inventors: Choonghwan Shin, Seoul (KR); Sangwook Hahn, Seoul (KR); Dukjun Kim, Seoul (KR); Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 14/759,585

(22) PCT Filed: Oct. 18, 2013

(86) PCT No.: PCT/KR2013/009349
§ 371 (c)(1),
(2) Date: Jul. 7, 2015

(87) PCT Pub. No.: WO2015/030294
PCT Pub. Date: Mar. 5, 2015

(65) Prior Publication Data
US 2015/0365119 A1      Dec. 17, 2015

(30) Foreign Application Priority Data

Aug. 28, 2013    (KR) .................. 10-2013-0102547

(51) Int. Cl.
*H04B 1/3827*    (2015.01)
*H04M 1/02*    (2006.01)

(52) U.S. Cl.
CPC .......... *H04B 1/385* (2013.01); *H04M 1/0233* (2013.01); *H04M 1/0241* (2013.01); *H04B 2001/3861* (2013.01)

(58) Field of Classification Search
CPC ............. H04M 1/0225; H04M 1/0227; H04M 1/0231; H04M 1/0233; H04M 1/0247; H04M 1/0249; H04M 1/0252; H04M 1/0254

USPC ................................................ 455/575.1
See application file for complete search history.

(56) References Cited

U.S. PATENT DOCUMENTS 8,328,055 B1    12/2012    Snyder
8,662,362 B1 *    3/2014    Bastian ............... H04B 1/3888
                                                                    224/197

(Continued)

FOREIGN PATENT DOCUMENTS

CN          103135440 A      6/2013
KR    10-2007-0111012 A    11/2007

(Continued)

OTHER PUBLICATIONS

International Search Report dated May 13, 2014 issued in Application No. PCT/KR2013/009349.

(Continued)

*Primary Examiner* — Vladimir Magloire
*Assistant Examiner* — Donald H Braswell
(74) *Attorney, Agent, or Firm* — KED & Associates, LLP

(57) ABSTRACT

There is disclosed a mobile terminal including a base body wearable on a user's body, a module body detachably coupled to the base body, a rotary unit coupled to a rear surface of the module body or an upper surface of the base body, the rotary unit comprising a rotary hinge portion provided in a center of the rotary unit, and a first coupling portion and a second coupling portion provided in a rear surface of the rotary unit and a front surface of the base body or a front surface of the rotary unit and a rear surface of the module body, respectively, the second coupling portion detachably coupled to the first coupling portion. The module body may be relatively rotated with respect to the base body. Accordingly, the functions of the mobile terminal can be converted and intuitive operation can be performed.

18 Claims, 16 Drawing Sheets

(56) References Cited

U.S. PATENT DOCUMENTS

| | | | | |
|---|---|---|---|---|
| 9,101,184 B2 * | 8/2015 | Wilson | ............... | A44C 5/14 |
| 2005/0276164 A1 * | 12/2005 | Amron | ............... | G04C 3/002 |
| | | | | 368/82 |
| 2007/0259648 A1 * | 11/2007 | Moon | ............... | H04M 1/0202 |
| | | | | 455/411 |
| 2008/0259094 A1 * | 10/2008 | Kim | ............... | G06F 1/1626 |
| | | | | 345/651 |
| 2010/0227642 A1 * | 9/2010 | Kim | ............... | H04M 1/72575 |
| | | | | 455/556.1 |
| 2011/0012796 A1 | 1/2011 | Kim et al. | | |
| 2012/0080462 A1 | 4/2012 | Hajarian | | |
| 2013/0087593 A1 | 4/2013 | Alvarez | | |
| 2014/0192493 A1 * | 7/2014 | Lerenthal | ............... | G06F 1/1635 |
| | | | | 361/752 |

FOREIGN PATENT DOCUMENTS

| | | | | |
|---|---|---|---|---|
| KR | 10-2009-0009025 | * | 1/2009 | ............... H04B 1/38 |
| KR | 10-2009-0009025 A | | 1/2009 | |
| KR | 10-2010-0050028 A | | 5/2010 | |
| KR | 10-2011-0027590 | * | 10/2012 | ............... H04B 1/38 |

OTHER PUBLICATIONS

European Search Report dated Mar. 24, 2017 issued in Application No. 13892559.9.

\* cited by examiner

[Fig. 1]
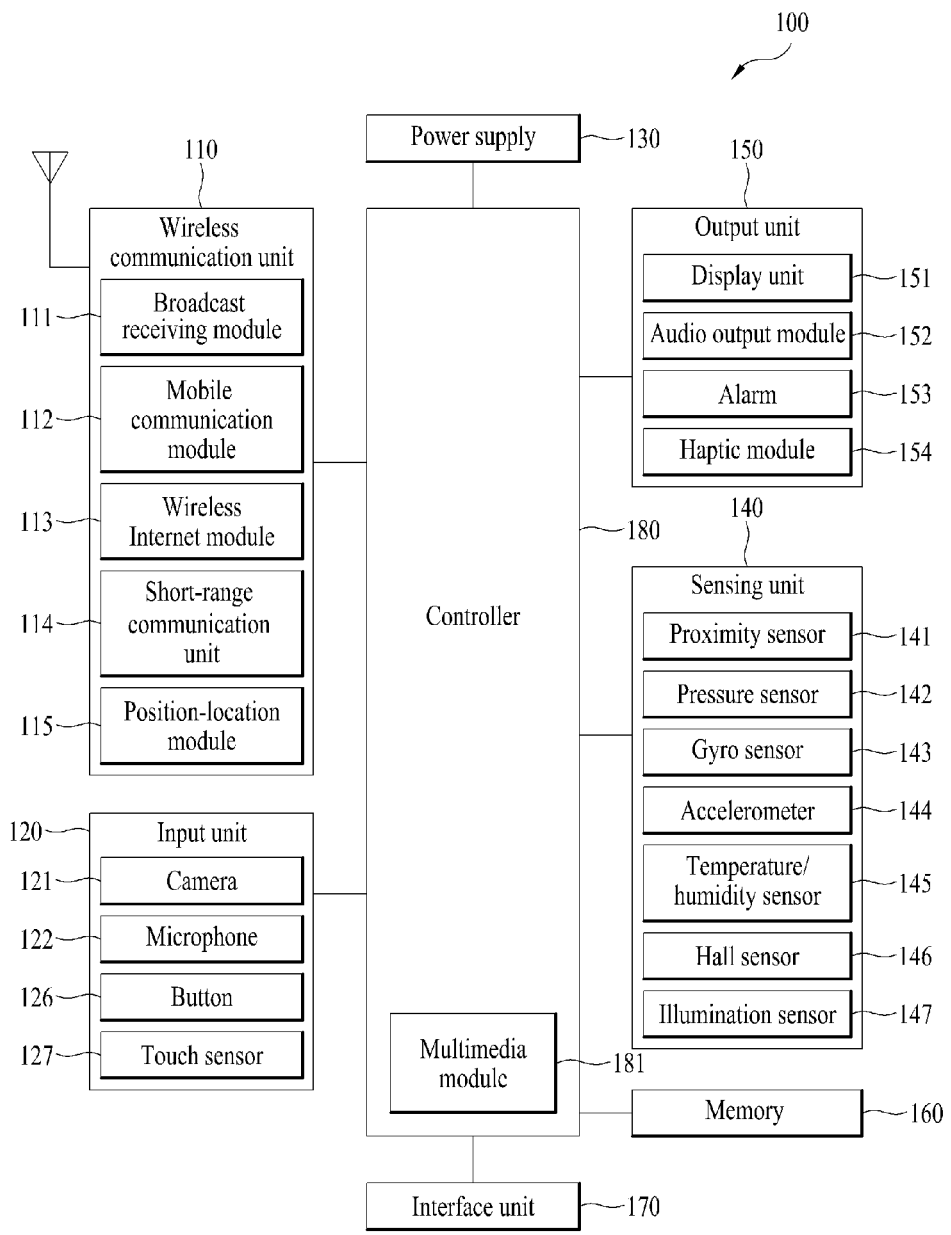

[Fig. 2]
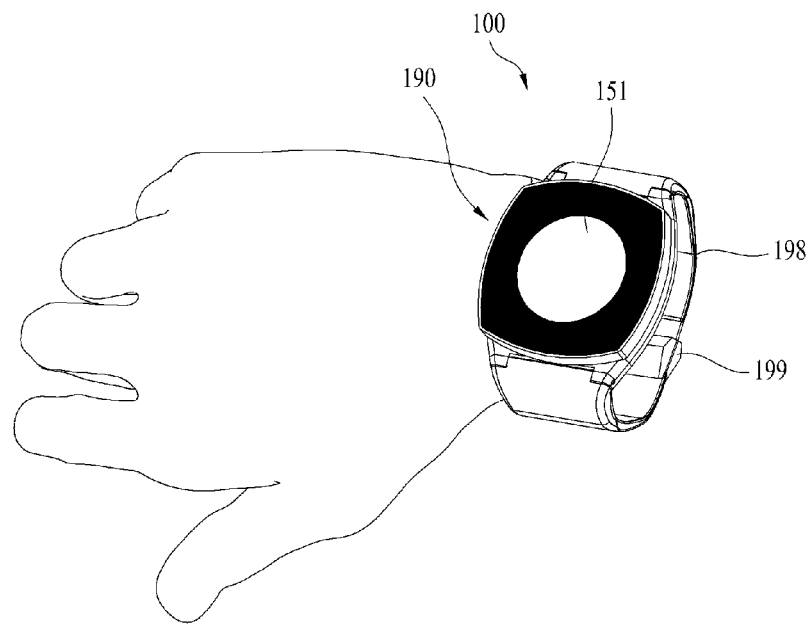
[Fig. 3]
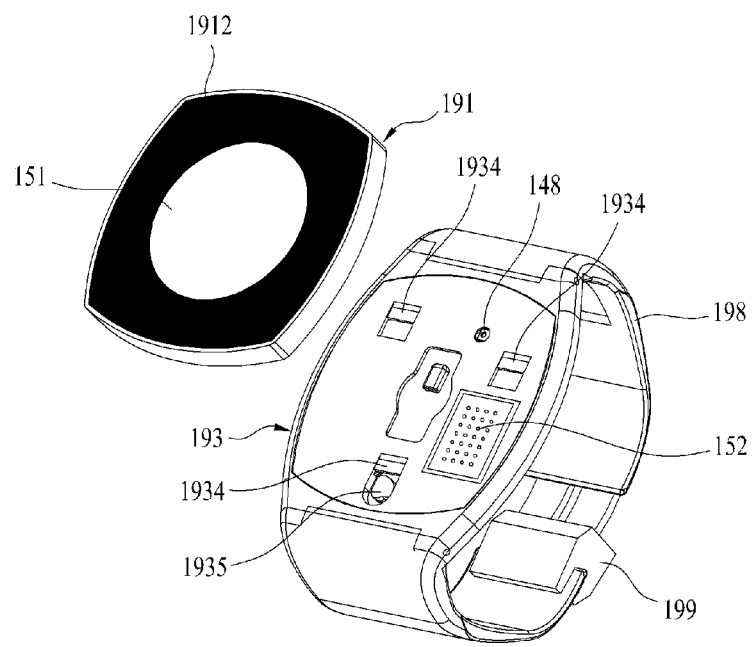

[Fig. 4]
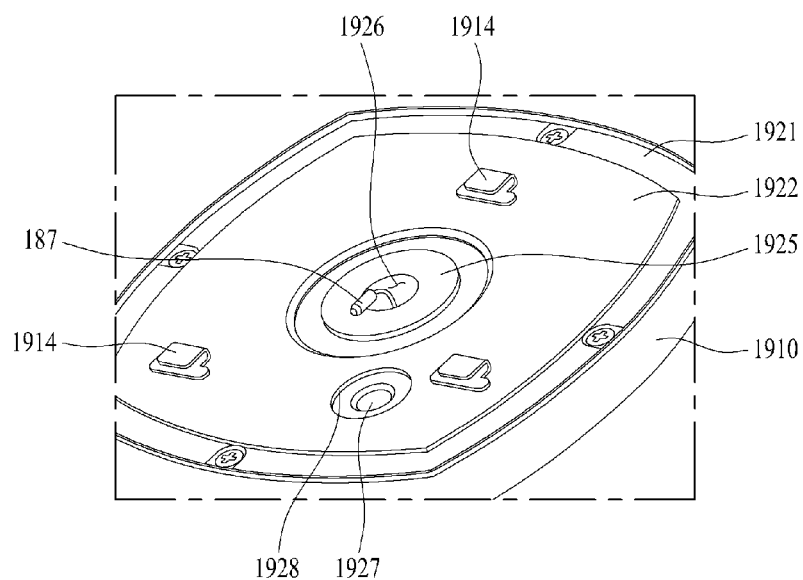

[Fig. 5]
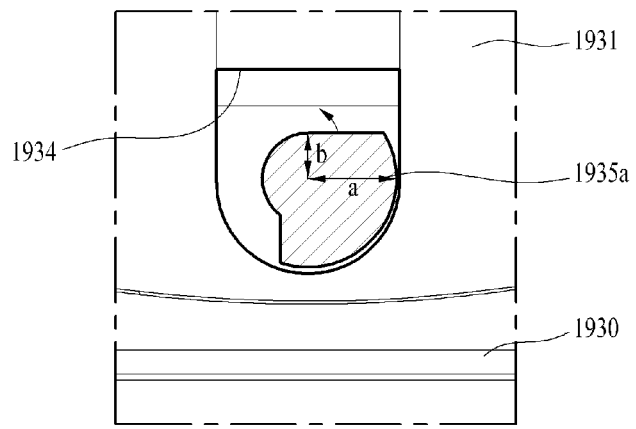
(a)
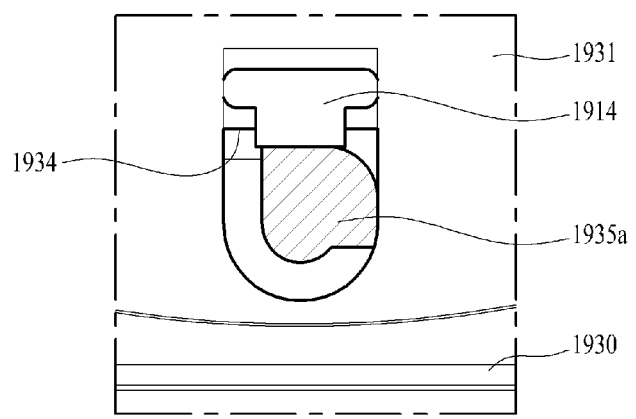
(b)

[Fig. 6]
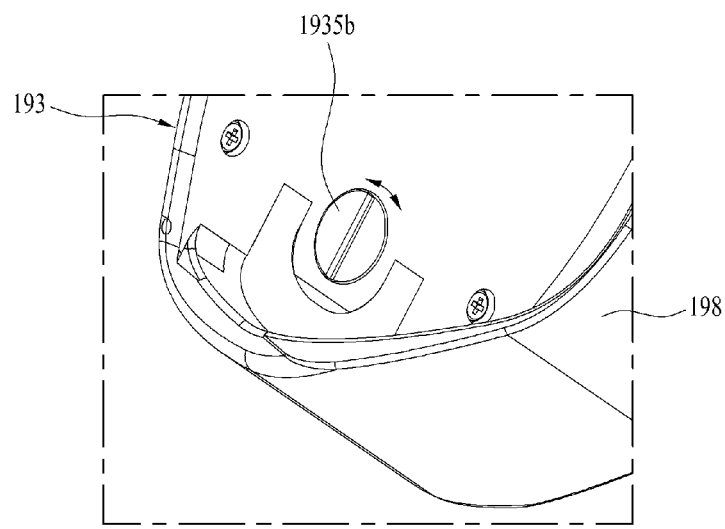
[Fig. 7]
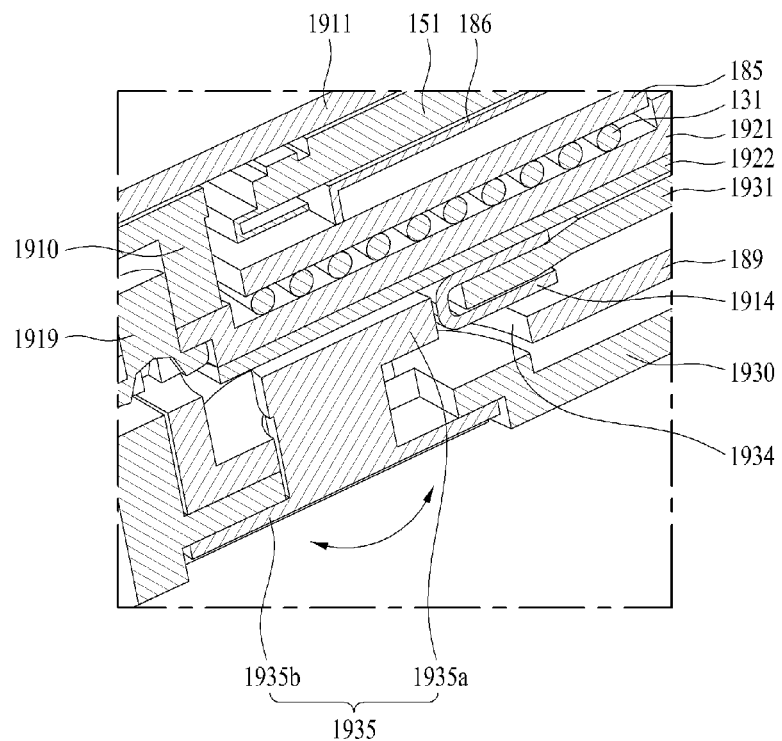

[Fig. 8]
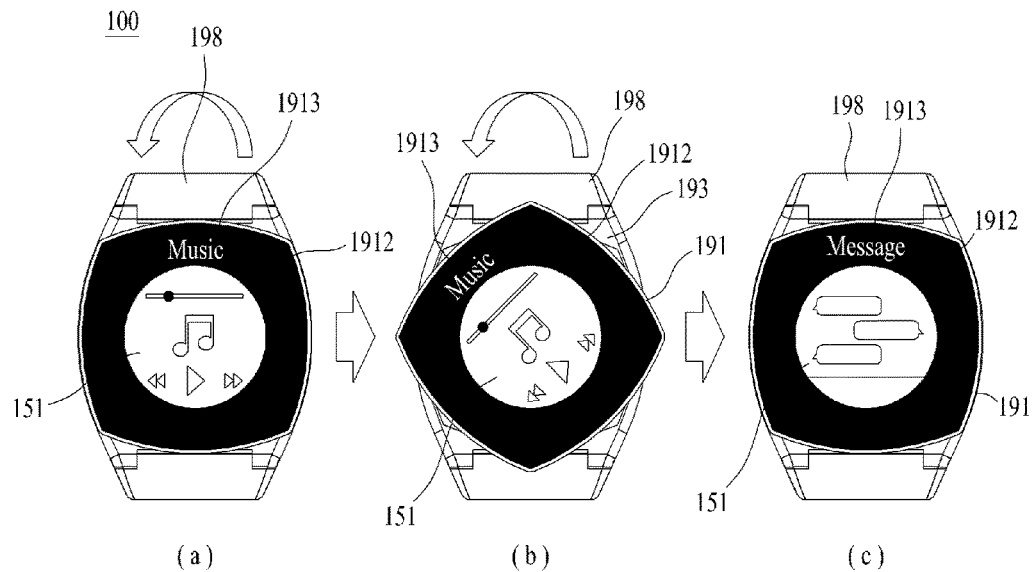
(a) (b) (c)
[Fig. 9]
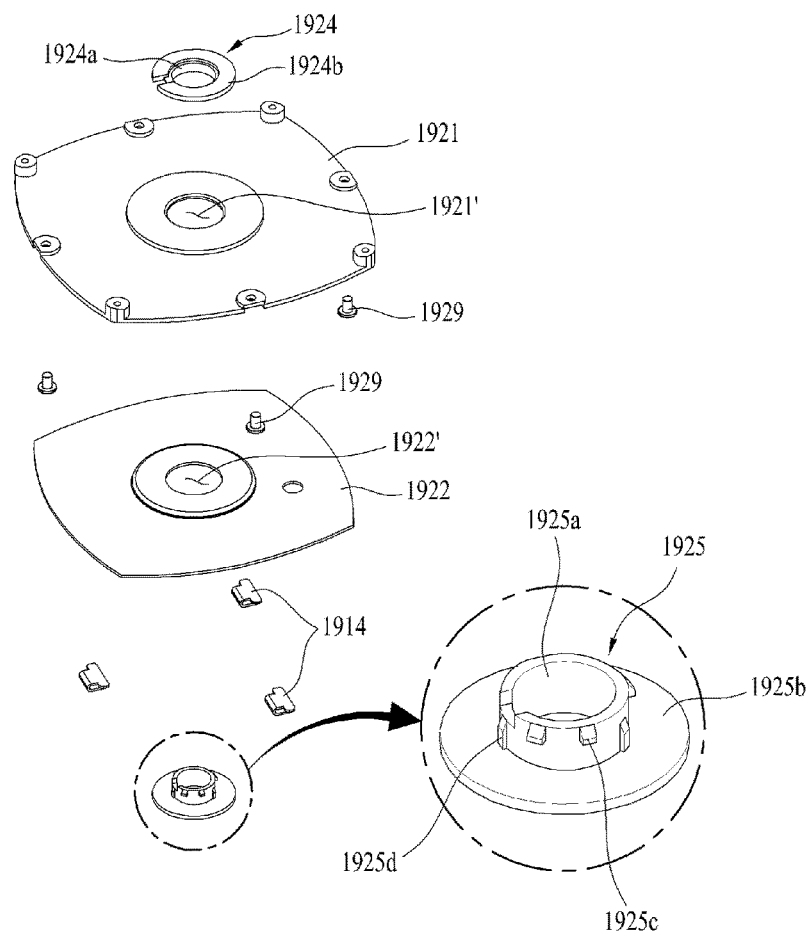

[Fig. 10]
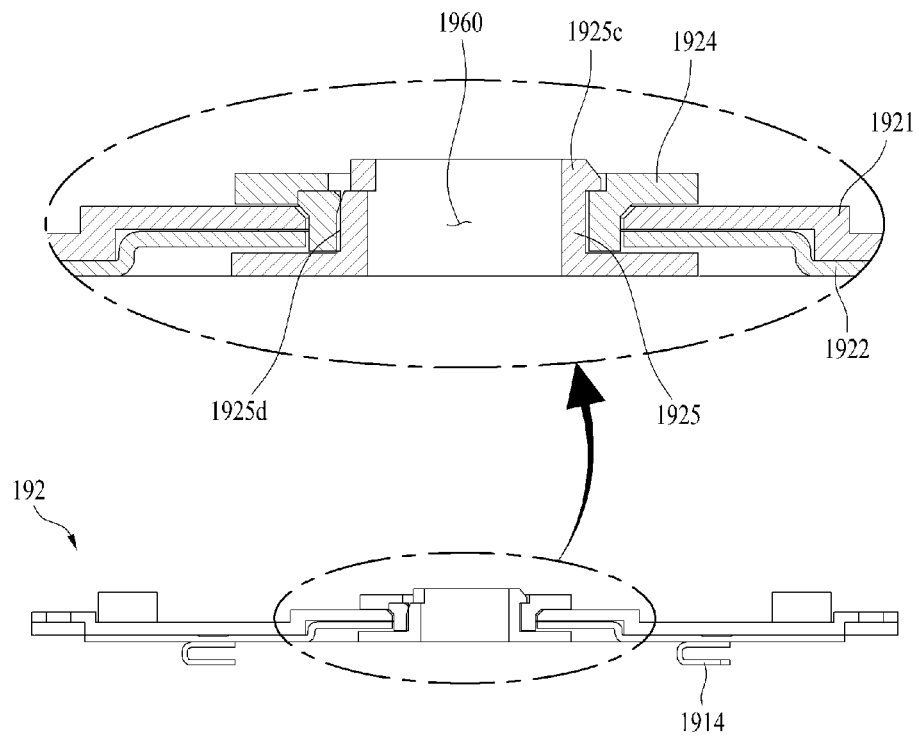
[Fig. 11]
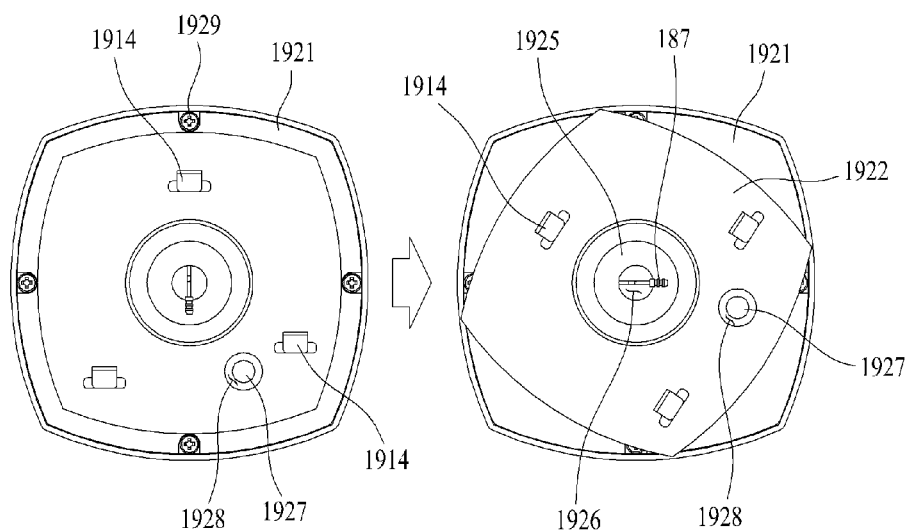

[Fig. 12]
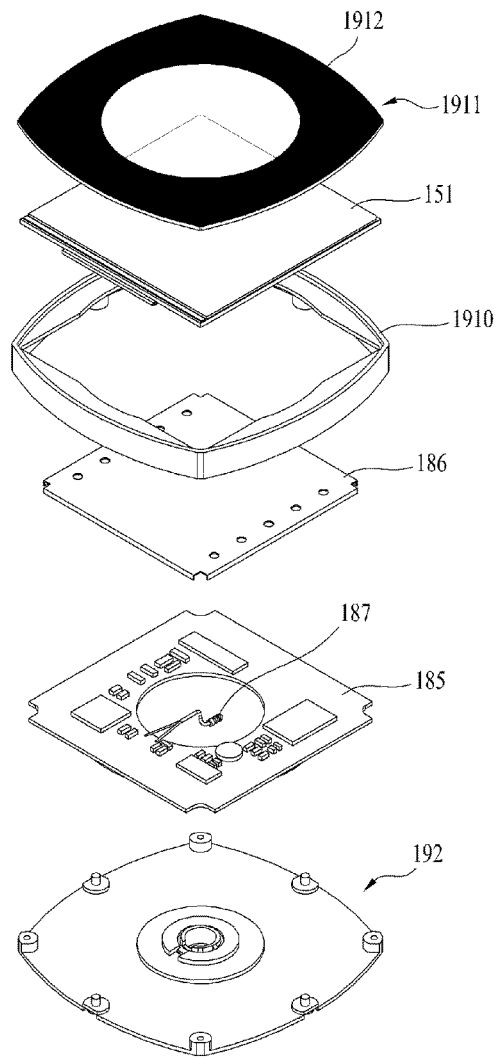
[Fig. 13]
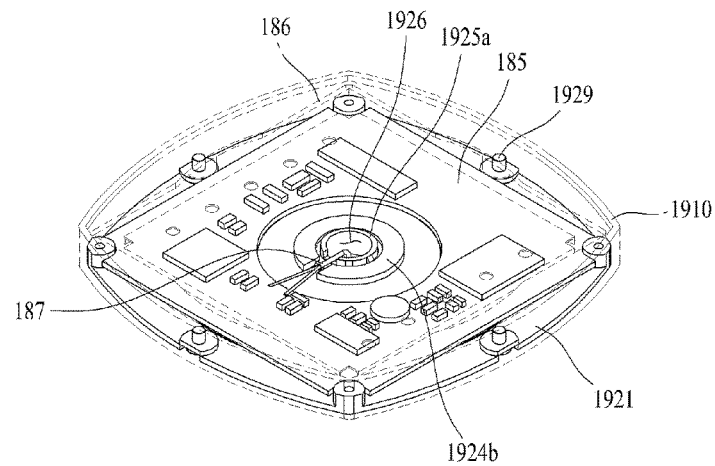

[Fig. 14]
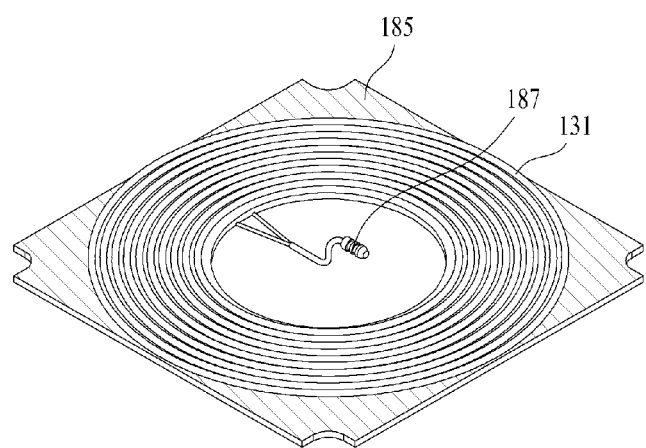

[Fig. 15]
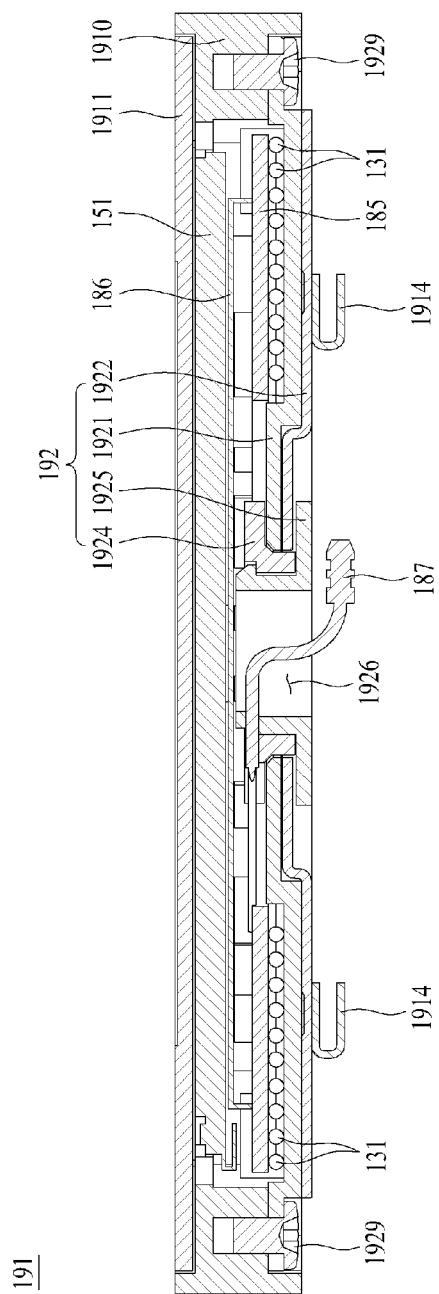

[Fig. 16]
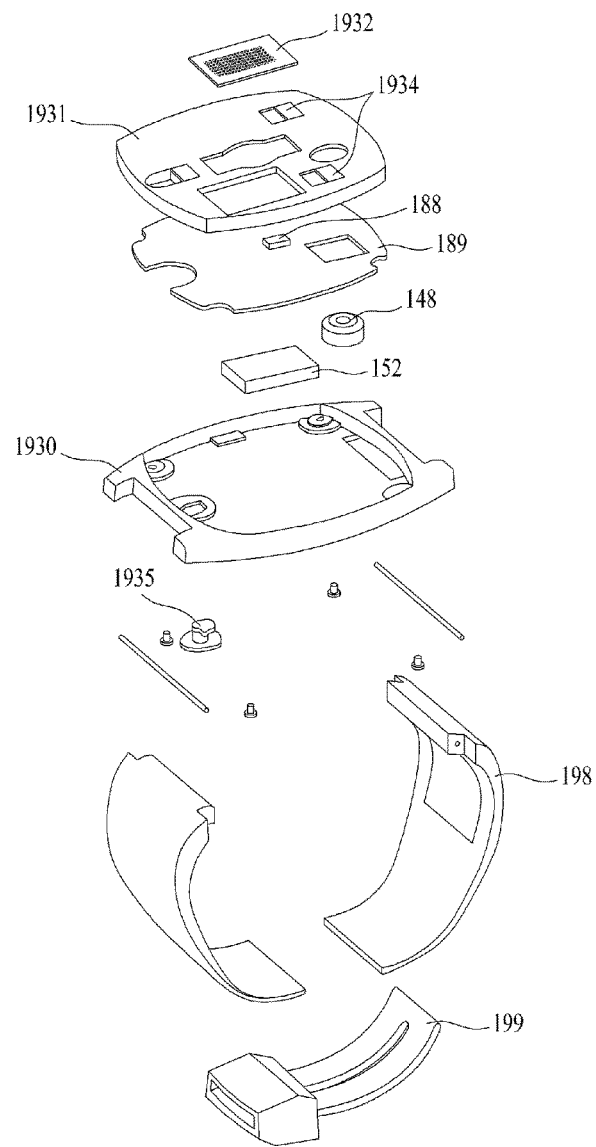
[Fig. 17]
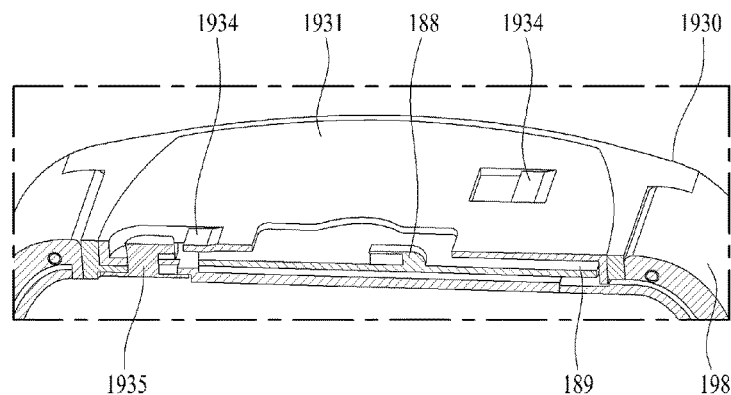

[Fig. 18]
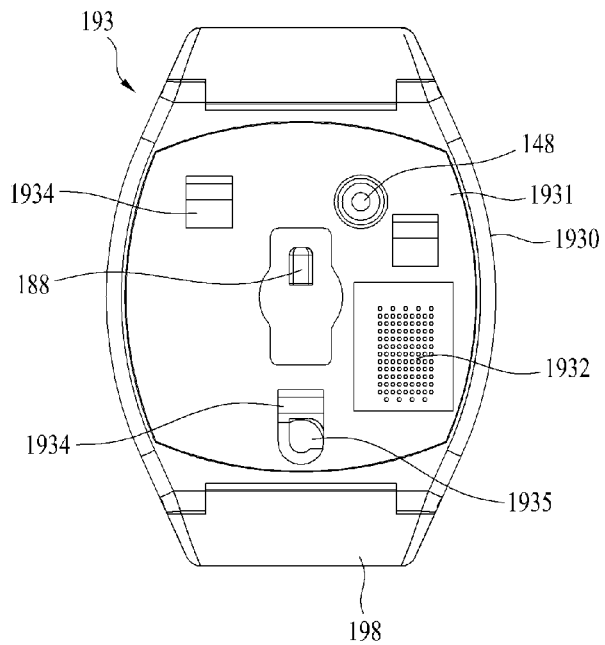
[Fig. 19]
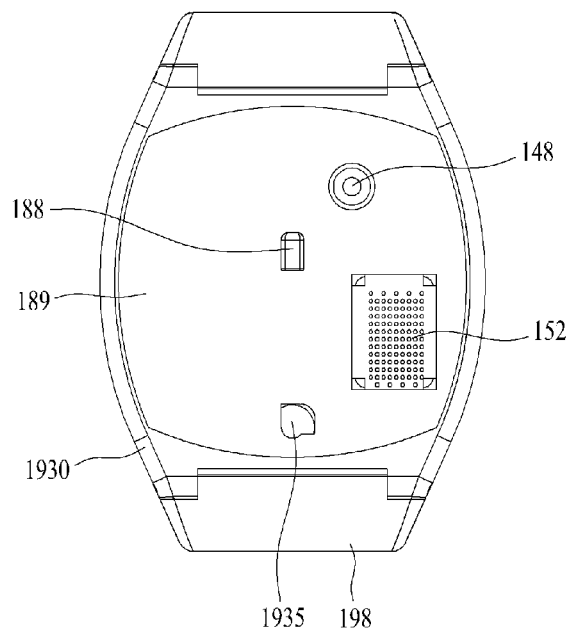

[Fig. 20]
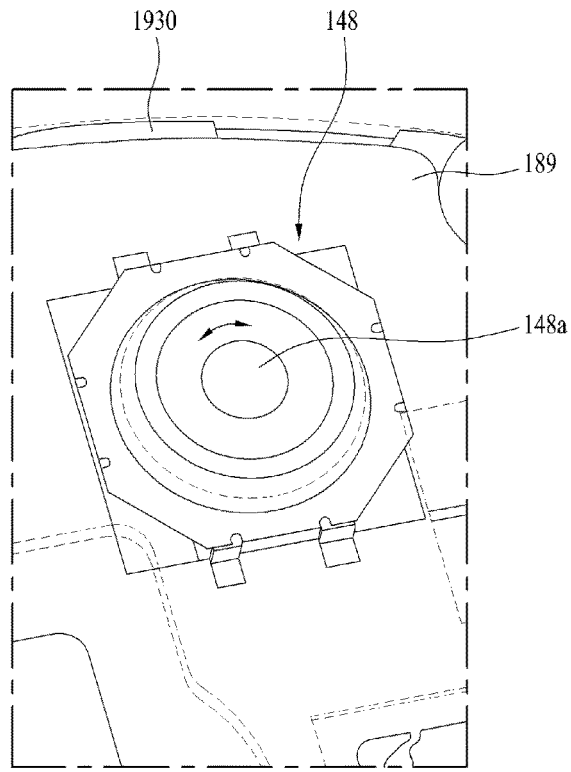
[Fig. 21]
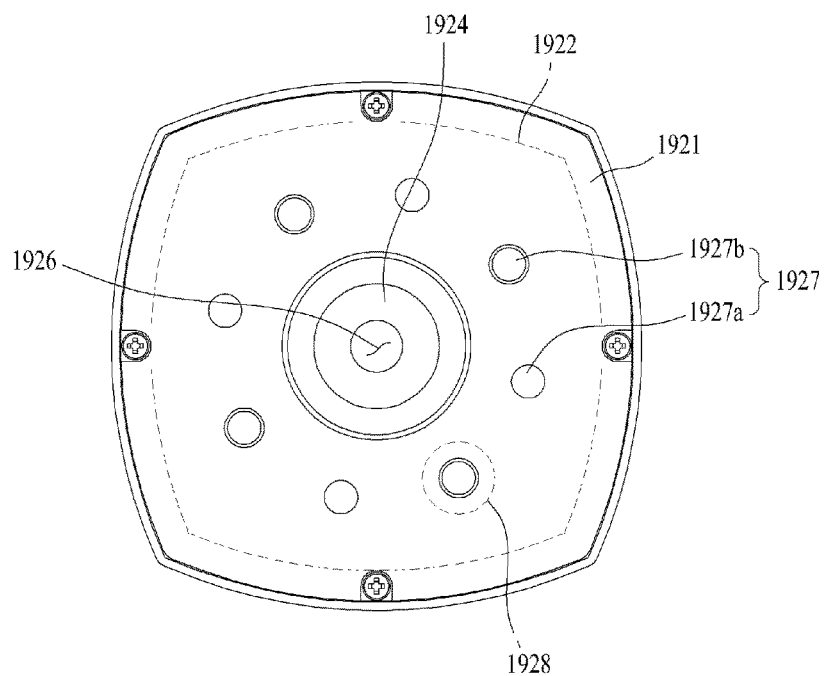

[Fig. 22a]
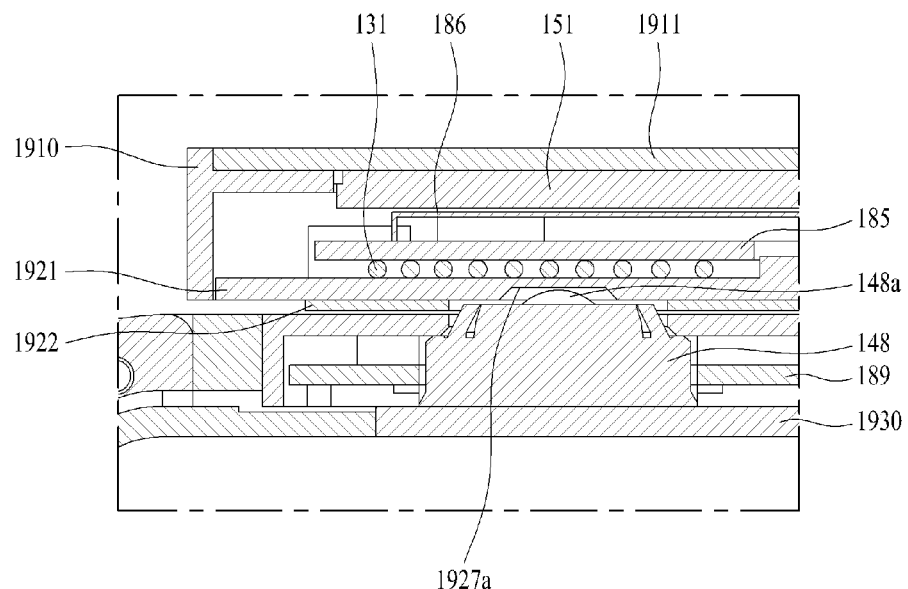
[Fig. 22b]
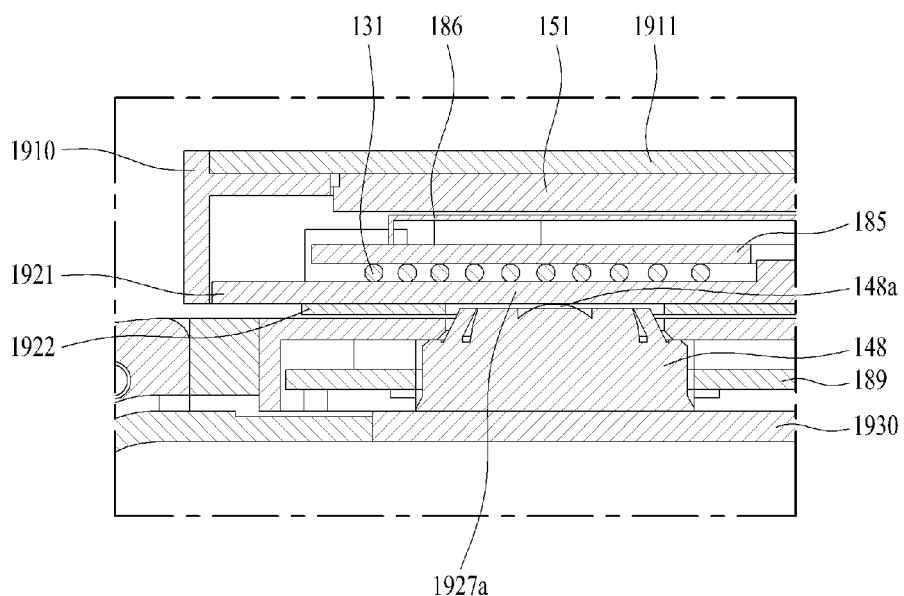

[Fig. 23]
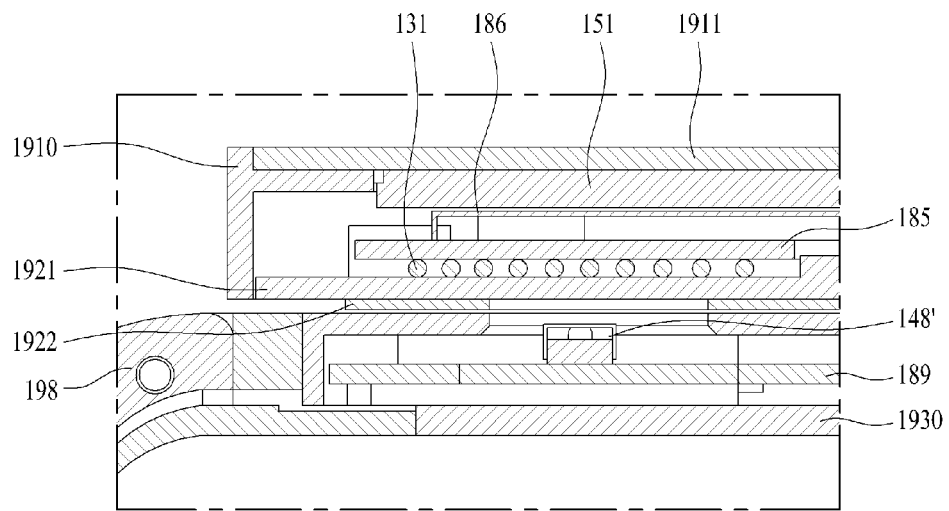
[Fig. 24]
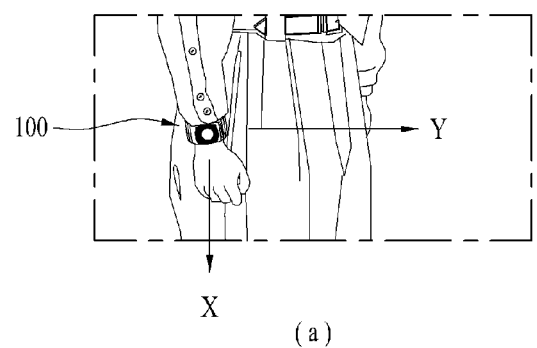
(a)
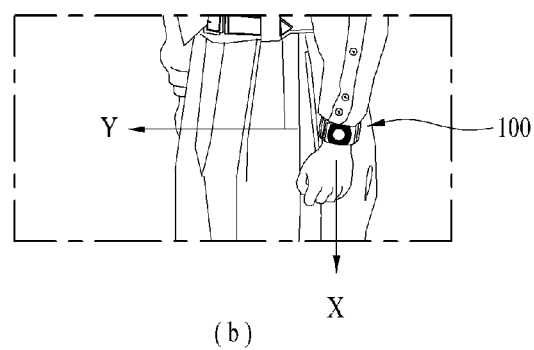
(b)

[Fig. 25]
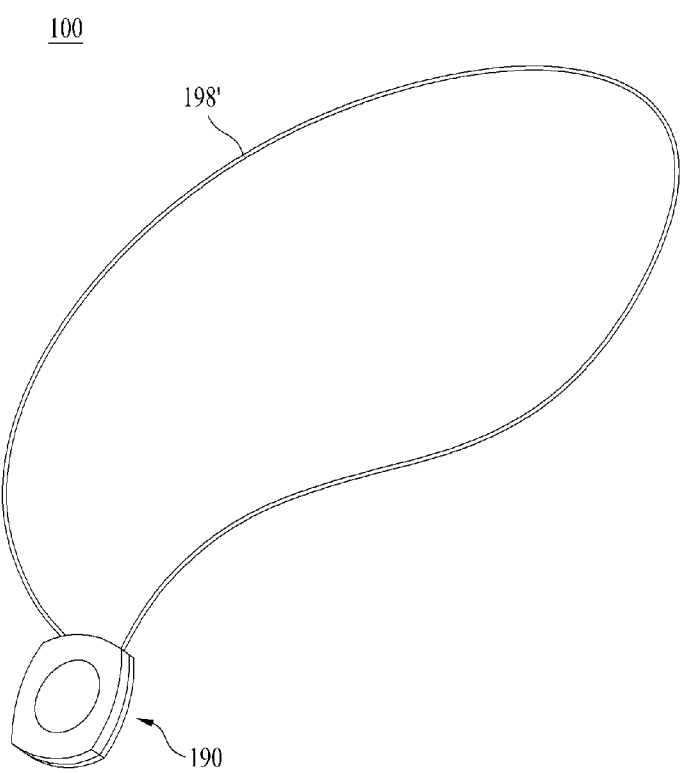

US 9,948,340 B2

WEARABLE MODULAR MOBILE DEVICE INCLUDING A ROTATABLE DISPLAY

CROSS-REFERENCE TO RELATED PATENT APPLICATIONS

This application is a U.S. National Stage Application under 35 U.S.C. § 371 of PCT Application No. PCT/KR2013/009349, filed Oct. 18, 2013, which claims priority to Korean Patent Application No. 10-2013-0102547, filed Aug. 28, 2013, whose entire disclosures are hereby incorporated by reference.

TECHNICAL FIELD

The present invention relates to a wearable mobile terminal which, more particularly, to a mobile terminal including a module body separable to make a mobile terminal wearable on a user body, which has a rotatable base body and a rotatable display.

BACKGROUND ART

There exists conventional mobile terminals that can be hand carried and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, numerous attempts are being made in terms of hardware or software. For example, a user interface is provided to allow users to easily and conveniently search for and select one or more functions.

Also, as users consider their mobile terminal to be a personal portable device, various designs may be applied for mobile terminals to express personality of users.

Conventional mobile terminals are sized to be held in hand, so users carry around their mobile terminal in a hand-held manner or carry around their mobile terminal in pockets, purses or belt clips. However, conventional hand-held mobile terminals can easily be lost or inadvertently dropped while being carried around.

For that, various types of wearable terminals (e.g., a watch type mobile terminal, a necklace type mobile terminal and a belt type mobile terminal) have emerged. Such a wearable mobile terminal can have a different size and different functions in accordance with a wearing type. Also, various types of wearable mobile terminals can be used in accordance with user necessities.

DISCLOSURE OF INVENTION

Technical Problem

An object of the present disclosure is to provide a mobile terminal y which a wearable mobile terminal which, more particularly, to a mobile terminal including a module body separable to make a mobile terminal wearable on a user body, which has a rotatable base body and a rotatable display.

Solution to Problem

To achieve these objects and other advantages and in accordance with the purpose of the invention, as embodied and broadly described herein, a mobile terminal includes a mobile terminal includes a base body wearable on a user s body; a module body detachably coupled to the base body; a rotary unit coupled to a rear surface of the module body or an upper surface of the base body, the rotary unit comprising a rotary hinge portion provided in a center of the rotary unit; and a first coupling portion and a second coupling portion provided in a rear surface of the rotary unit and a front surface of the base body or a front surface of the rotary unit and a rear surface of the module body, respectively, the second coupling portion detachably coupled to the first coupling portion.

The first coupling portion may be provided in the rear surface of the rotary unit, and the second coupling portion may be provided in the front surface of the base body. The mobile terminal may further include a fixing member configured to fix the first coupling portion to prevent separation of the first coupling portion from the base body after coupled to the base body.

The first coupling portion may be a hook and the second coupling portion may be a hooking groove formed in the front surface of the base body to insert the hook therein, and a cam may be provided in one end of the fixing member to rotate to be in close contact with the hook after the hook is inserted in the hooking groove.

A rotary plate may be provided in the other end of the fixing member to be exposed to the rear surface of the base body to rotate the cam manually.

The rotary unit may include an upper plate provided in a rear surface of the module case, the upper plate comprising a first hinge hole formed in a center thereof; a lower plate provided below the upper plate, the lower plate comprising a second hinge hole formed in a center thereof; and a cylindrical hinge portion penetrating the first hinge hole and the second hinge hole.

The hinge portion may include a lower hinge inserted in the second hinge hole from a rear surface of the lower plate; and an upper hinge inserted in the first hinge hole from a front surface of the upper plate to be coupled to the lower hinge.

Each of the lower and upper hinges may include a cylindrical portion penetrating the first hinge hole and the second hinge hole; and a ring plate provided in a front surface of the lower or upper plate.

The cylindrical portion of the upper hinge may be forcedly fitted to an outer or inner portion of the cylindrical portion of the lower hinge.

The mobile terminal may further include a hook projected from one end of the cylindrical portion arranged in an inner position, wherein the cylindrical portion of the upper hinge is inserted to an outer or inner surface of the cylindrical portion of the lower hinge.

The mobile terminal may further include a printed circuit board arranged in the module case; and a connector extended from the printed circuit board to be connected to the body, wherein the connector is projected to a rear surface of the module body via the cylindrical portion.

The mobile terminal may further include a rotation detecting sensor exposed via the hole to detect whether one of the stoppers is positioned in the sensor hole, wherein the upper plate comprises a plurality of stoppers recessed or projected at predetermined intervals spaced apart the same distance from the hinge portion, and a sensor hole is formed in the lower plate, spaced apart the same distance from the stoppers.

The rotation detecting sensor may include at least one of a jog ball sensor, a pressure sensor, an altitude sensor and an infrared sensor.

The mobile terminal may further include a printed circuit board arranged in the module case; and a wireless charging coil arranged in the module case.

The mobile terminal may further include a controller configured to change a function based on a rotational angle of the rotary unit.

The mobile terminal may further include a bezel provided in an edge portion of the display; a function display unit output to the bezel, wherein a position of the function display unit is changed to be displayed at the relatively same position in the body when the module body is rotated.

The position change of the function display unit may be performed at every 350/n of the module body rotation.

The base body may further include a speaker.

The mobile terminal may further include at least one of a hall sensor, a terrestrial magnetism sensor and an acceleration sensor.

The mobile terminal may further include a short range communication module configured to transmit and receive information to and from an external terminal.

The base body may include at least one of a watch type base body comprising a band wearable on a user s hand or arm; a necklace type body comprising a strap wearable on the user's neck; and a clip type base body comprising a clip inserted in a shoe or clothes.

The mobile terminal may further include a controller configured to identify the type of the base body or the type of the body coupled by the user the module body, sensing an identifier of the base body, and to set the type of the base body coupled to the module body, and to designate a different operation mode in accordance with the set type of the body.

The mobile terminal may further include an operation sensor configured to sense an operation of the mobile terminal; and a controller configured to provide a screen for a right hand mode to the display, when the operation sensor senses a perpendicular motion in an (+) direction with respect to a gravity direction in a state where the body is tilted for the display to be toward a lateral surface, and to provide a screen for a left hand mode to the display, when the operation sensor senses a perpendicular motion in a (−) direction with respect to the gravity direction in a state where the body is tilted for the display to be toward a lateral surface, wherein the base body is a watch type base body comprising a band wearable on a user's hand or arm.

Advantageous Effects of Invention

According to at least one embodiment of the present invention, the module body and the base body are separable and various types of wearable mobile terminals can be realized.

Furthermore, the module body may be relatively rotated with respect to the base body. Accordingly, the functions of the mobile terminal can be converted and intuitive operation can be performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings FIG. 1 is a block diagram of a mobile terminal according to one embodiment of the present invention;

FIG. 2 is a front perspective diagram of a mobile terminal according to one embodiment of the present invention;

FIG. 3 is a perspective diagram of a mobile terminal according to one embodiment of the present invention, in which a module body detached from a base body of the mobile terminal is shown;

FIG. 4 is a rear perspective diagram of a mobile terminal according to one embodiment of the present invention;

FIG. 5 is a plane view illustrating a second coupling portion and a fixing member provided in the mobile terminal according to one embodiment of the present disclosure;

FIG. 6 is a rear view of FIG. 5;

FIG. 7 is a sectional diagram of FIG. 5;

FIG. 8 is a front view illustrating a state where a module body provided in the mobile terminal according to one embodiment of the present disclosure is rotated with respect to a base body;

FIG. 9 is an exploded perspective diagram illustrating a rotary unit provided in the mobile terminal according to one embodiment of the present disclosure;

FIG. 10 is a sectional diagram illustrating the rotary unit provided in the mobile terminal according to one embodiment of the present disclosure;

FIG. 11 is a rear view illustrating the rotary unit, when the module body of the mobile terminal according to one embodiment of the present disclosure is rotated with respect to a base;

FIG. 12 is an exploded perspective diagram illustrating the module body provided in the mobile terminal according to one embodiment of the present disclosure;

FIG. 13 is a perspective diagram illustrating a coupling state of the module body provided in the mobile terminal according to one embodiment of the present disclosure;

FIG. 14 is a rear perspective diagram of a printed circuit board provided in the mobile terminal according to one embodiment of the present disclosure;

FIG. 15 is a sectional diagram illustrating the module body provided in the mobile terminal according to one embodiment of the present disclosure;

FIG. 16 is an exploded perspective diagram illustrating a base body provided in the mobile terminal according to one embodiment of the present disclosure;

FIG. 17 is a sectional diagram illustrating the base body provided in the mobile terminal according to one embodiment of the present disclosure;

FIG. 18 is a plane view illustrating the base body provided in the mobile terminal according to one embodiment of the present disclosure;

FIG. 19 is a plane view illustrating a second base body which is separated from the state shown in FIG. 18;

FIG. 20 is a perspective diagram illustrating a rotation detecting sensor provided in the mobile terminal according to one embodiment of the present disclosure;

FIG. 21 is a rear view illustrating an upper plate provided in the rotary unit of the mobile terminal according to one embodiment of the present disclosure;

FIGS. 22a and 22b are sectional diagrams illustrating an operational state of the rotation detecting sensor provided in the mobile terminal according to one embodiment of the present disclosure;

FIG. 23 is a sectional diagram illustrating another embodiment of the rotation detecting sensor provided in the mobile terminal according to one embodiment of the present disclosure;

FIG. 24 is a diagram illustrating a state where the mobile terminal according to one embodiment of the present disclosure is put on a user s body; and FIG. 25 is a perspective diagram illustrating a mobile terminal according to another embodiment of the present disclosure.

BEST MODE FOR CARRYING OUT THE INVENTION

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that suffixes module and part when used in this specification, are used only in consideration of convenience in making specification and they should not be distinguished from each other in meanings or functions.

Hereinafter, exemplary embodiments of the disclosed subject matter will be described in detail with reference to the accompanying drawings. Referring to the accompanying drawings, a mobile terminal 100 according to one embodiment of the present invention will be described in detail as follows. Reference may now be made in detail to specific embodiments, examples of which may be illustrated in the accompanying drawings. Wherever possible, same reference numbers may be used throughout the drawings to refer to the same or like parts.

Hereinafter, exemplary embodiments of the disclosed subject matter will be described in detail with reference to the accompanying drawings. Referring to the accompanying drawings, a mobile terminal 100 according to one embodiment of the present invention will be described in detail as follows. Reference may now be made in detail to specific embodiments, examples of which may be illustrated in the accompanying drawings. Wherever possible, same reference numbers may be used throughout the drawings to refer to the same or like parts.

FIG. 1 is a block diagram of a mobile terminal 100 in accordance with an embodiment as broadly described herein. The mobile terminal 100 may include a wireless communication unit 110, an input unit 120, a sensing unit 140, an output unit 150, a memory 160, an interface unit 170, a controller 180, a power supply unit 130 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

A button 126 may be provided in a front, rear or lateral surface of the mobile terminal 100 to sense a pressure to receive signal input. A touch sensor 137 detects change in pressures or capacities which is generated by the user s finger touch and receives signal input. Especially, the touch sensor 137 and the display 151 may be disposed, forming a layer, or integrally formed with each other. In this instance, the display 151 may perform a function as an output device and a function as an input device.

The power supply unit 130 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

The sensing unit 140 senses a current state of the mobile terminal 100 such as the position of the watch type mobile terminal 100, presence of the user s touch, the direction of the mobile terminal, acceleration/deceleration of the mobile terminal and generates a sensing signal to control the operations of the mobile terminal 100. The sensing unit 140 may include a proximity sensor 141, a gyrosensor 143 and an acceleration sensor 144, a temperature/humidity sensor 145, a hall sensor 146 and a photo sensor 147.

The proximity sensor 141 is a sensor configured to detect the presence of an object approaching a predetermined detection surface or existing nearby by using an electronic force or an infrared ray, without mechanical contact. The proximity sensor 141 may be provided adjacent to the display 151. Also, the proximity sensor 141 lasts longer and is more useful than a contact sensor.

Examples of the proximity sensor 141 include a transmission photo sensor, a direct reflection photo sensor, a mirror reflection photo sensor, a high-frequency oscillation type proximity sensor, a capacitive proximity sensor, a magnetic proximity sensor and an infrared proximity sensor.

The gyro sensor 143 is an angular velocity sensor configured to detect an angular velocity, specifically, which detects angular variation of three shafts. The gyro sensor calculates the angle of an object rotated on a shaft for a unit time period. Recently, a small-sized gyro sensor can be used in detecting the velocity, distance and position of the mobile terminal 100, using MEMS technology.

The acceleration sensor 144 can sequentially sense motional states of an object by sensing a dynamic force, for instance, acceleration, vibration and external shocks. The acceleration sensor 144 is classified into a dynamic acceleration sensor and a thermo acceleration sensor. When a piezoelectric conductor for calculating acceleration by detecting the electric charge generated when a predetermined force is applied to a piezoelectric element is detected is moving in a magnetic field, an electromotive force is generated in proportion to the velocity of the moving conductor and the dynamic acceleration sensor detects the acceleration of the detected electromotive force. The thermo acceleration sensor calculates the acceleration by detecting electric currents from the variation of electrons.

The acceleration sensor 144 or the gyro sensor 143 detects the position of the mobile terminal 100 and may be referenced to as the position sensors 143 and 144.

The temperature/humidity sensor 145 is a sensor configured to recognize temperatures and humidity near the mobile terminal. The temperature/humidity sensor 145 may provide information on temperatures and humidity to the user or transmit a warning message when the detected temperature and humidity is over an allowable value.

The hall sensor 146 is a sensor which senses change in the magnetic field and it generates a signal when the magnetic field is changed by an approaching magnet. When a flip cover having a magnet covers the display, the hall sensor 146 may sense the presence of the magnet and control the mobile terminal 100 to be locked or a screen to be partially displayed.

The photo sensor 147 is a sensor which senses a photo nearby. The photo sensor 147 includes not only a luminance sensor for measuring luminance nearby but also a RGB sensor for sensing red, blue, green and red lights for each of wavelengths. Using the photo sensor 147, lights near the mobile terminal may be sensed and the luminance of the display 151 may be changed or a color sense may be controlled.

Moreover, there may be further provided a terrestrial magnetism sensor which can measure a precise direction, sensing the intensity of the magnetic field, and an atmospheric pressure sensor which can measure the altitude where the user is located in accordance with a difference between pressures after sensing the pressure at the user s current location.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called touch screen), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154.

Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called identity device) can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touch-screen as characters or images, respectively.

FIG. 2 is a perspective diagram illustrating a state where the user wears the mobile terminal 100 according to one embodiment of the present disclosure. FIG. 3 is an exploded perspective diagram illustrating a module body and a base body 193 provided in the mobile terminal according to one embodiment.

The mobile terminal 100 may include a terminal body 190 having the display 151 arranged in an outer surface thereof to display visual information. The terminal body 190 may be connected to a strap 198 formed to be put on a body part (e.g., a wrist and an arm).

The body 190 may be divided into two bodies 191 and 193, specifically, a module body 191 and a base body 193. The module body 191 includes the display 151 and the base body 193 may be coupled to the strap 198 for the user to wear the mobile terminal. the strap 198 coupled to the base body 193 may be a watch type strap 198 and a necklace type strap 198 shown in FIG. 25 illustrating another embodiment of the watch type mobile.

The display 151 may occupy most of a main surface possessed by the mobile terminal 100. Although not shown in the drawings, an audio output module 152, a camera 121, a user input unit 126 and 126/and a microphone 122 may be arranged near the display 151.

The strap 198 shown in FIGS. 2 and 3 may be a flexible strap easily put on a human body or segmented frames hingedly connected with each other to be transformed for a human body, formed of metal or plastics.

The strap 198 may include a fastener 199. The fastener 199 may be realized as a buckle, a snap-fittable hook or Velcro and it may have an elastic portion or material. The strap 198 may further include an antenna for wireless communication to enlarge an insufficient mounting space.

The module body 191 according to the embodiment of the present disclosure may be separable from the base body 193 as shown in FIG. 3 and it may be also rotatable. A rotary unit 192 coupled to a rear surface of the module body 191 enables the rotation of the module body. The rotary unit 192 may include a hinge portion 1923, a lower plate 1922 coupled to the base body 193 and an upper plate 1921 coupled to the module body 191. The rotary unit 192 will be described later in detail.

FIG. 4 is a perspective diagram illustrating the rear surface of the module body 191 provided in the mobile terminal 100 according to one embodiment of the present disclosure. The module body 191 and the base body 193 may include coupling portions 1914 and 1934, respectively. The positions of the coupling portions 1914 and 1934 may be variable based on whether the rotary unit 192 is coupled to the module body 191 or the base body 193 by a screw 1929 not to be separated there from.

Specifically, when the rotary unit 192 is coupled to the module body 191, a first coupling portion 1914 may be provided in a rear surface of the rotary unit 192 shown in FIG. 4 and a second coupling portion 1934 coupled to the first coupling portion 1914 may be provided in a front surface of the base body 193. In contrast, when a hinge portion 1923 is coupled to the base body 193, a first coupling portion 1914 may be provided in a rear surface of the module body 191 and a second coupling portion 1934 may be provided in a front surface of the rotary unit 192.

To explain the present disclosure more easily, the embodiment that the rotary unit 192 is fixed to the rear surface of the module body 191 by the screw 1929 to couple the first coupling portion 1914 to the rotary unit 192 and the second coupling portion 1934 to the base body 193 will be adopted and the present disclosure is not limited thereto.

To couple the module body 191 and the base body 193 to each other, the first coupling portion 1914 shown in FIG. 4 may be provided in the rear surface of the rotary unit 192 and the second coupling portion coupled to the first coupling portion 1914 shown in FIG. 3 may be provided in the front surface of the base body 193.

As shown in FIGS. 3 and 4, the first coupling portion 1914 may be a hook type and the second coupling portion 1934 may be a hooking groove to insertedly hook the first coupling portion 1914 thereto. In contrast, the first coupling portion formed in the rear surface of the rotary may be a hooking groove and the second coupling portion formed in the front surface of the base body may be a hook.

The module body 191 having the rotary unit 192 coupled to the rear surface thereof may be insertedly pushed and coupled to the base body 193 so as to couple the first coupling portion 1914 to the second coupling portion 1934. When a force is applied in the reverse direction of the pushing direction of the module body 191, the first coupling portion 1914 might be separated from the second coupling portion 1934. To solve a problem of such separation, a fixing member 1935 may be further provided.

FIGS. 5, 6 and 7 are plane and rear views and a sectional diagram illustrating the first coupling portion 1914, the second coupling portion 1934 and the fixing member 1935 in the mobile terminal 100 according to one embodiment. Referring to FIGS. 5, 6 and 7, the fixing member 1935 formed in at least one of the second coupling portions 1934 may prevent movement of the first coupling portion 1914 toward a direction in which the first coupling portion 1914 coupled to the second coupling portion 1934 might be separated.

As shown in FIG. 7, the fixing member 1935 may be rotatably coupled to the base body 193 and one portion of the fixing member 1935 may be exposed toward the rear surface of the base body 193 and the other portion may be positioned toward the front surface of the base body 193.

Referring to FIG. 6, the user may put a coin or the nail in a recess formed in a rotary plate 1935b exposed to the rear surface of the base body 193 to rotate the rotary plate. Once the user rotates the rotary plate 1935b, a cam 1935a provided toward the front surface of the base body 193 may be rotated together. The cam 1935a has a nonsymmetrical shape with respect to a rotary axis and it is divided into a short distance portion and a long distance portion b from the rotation axis.

When the first coupling portion 1941 is coupled to the second coupling portion 1934 as shown in FIG. 5 (a), the short distance portion (a) is positioned toward the second coupling portion 1934 only to provide a predetermined space where the first coupling portion 1941 can be inserted. After the first coupling portion is coupled to the second coupling portion 1934, the fixing member 1935 may be rotated to make the long distance portion (b) from the first coupling portion 1914 and the rotation axis contact with the first coupling portion 1914.

Accordingly, the fixing member 1935 can prevent the first coupling portion 1914 from being detached from the second coupling portion 1934 such that the module body 191 and the base body 193 cannot be separated unintentionally.

FIG. 8 is a front view illustrating a state the module body 191 of the mobile terminal 100 according to one embodiment of the present disclosure is rotated with respect to the base body 193. As mentioned above, the module body 191 may be relatively rotated by the rotary unit 192 arranged between the module body 191 and the base body 193.

When the module body 191 is rotated, the base body 193 may be fixed and the direction seen by the user cannot correspond to the direction of the rotated module body 191. When the module body 191 is rotated a predetermined angle, the display 151 may be rotated to enhance the readability.

In the drawing, the direction of the screen is changed when the display 151 is rotated 90 degrees. Alternatively, the direction of the screen provided by the display 151 may be changed at every unit angle that is 45 degrees or less.

Not only the direction of the screen, the function of the mobile terminal 100 may be changed as the module body 191 is rotated as shown in FIG. 8. When the module body 191 is rotated 90 degrees, the function may be changed from music to a texture message and the angle may be set by the user.

A bezel 1912 may be formed by partially printing an opaque ink on a window glass 1911 provided in the front surface of the display 151 to cover a non-display area where a screen is not output rather than a display area where the screen of the display is output. The bezel 1912 may be provided in an edge area of the display 151.

At this time, a function display unit 1913 may be provided in a predetermined area of the bezel 1912 to display change of the function. For example, a hole may be formed in a predetermined portion of the bezel 1912 and a function display unit 1913 configured to display the function implemented in the mobile terminal 100 may be realized in the hole.

As shown in FIG. 8, the position of the function display unit 1913 is also changed when the screen direction of the display 151 is changed over a predetermined angle. The position of the function display unit 1913 may be changed in accordance with the change of the screen direction of the display. The position of the function display unit 1913 may be changed at every angle that is different from a unit angle of the screen direction change.

The rotary unit 192 arranged between the module body 191 and the base body 193 to rotate the module body 191 includes an upper plate 1921, a lower plate 1922 and a hinge portion 1923 inserted in hinge holes 1921 and 1922 formed in the upper and lower plates 1921 and 1922, respectively.

The hinge portion 1923 includes an upper hinge 1924 inserted in a front surface of the upper plate 1921 and a lower hinge 1925 inserted in a rear surface of the lower plate 1922. Each of the hinges 1921 and 1922 includes a cylindrical portion 1924a and 1925a inserted in each of the hinge holes 1921 and 1922 and a ring plate 1924b and 1925b in close contact with the upper plate 1921 or the lower plate 1922.

One of the cylindrical portions 1924a and 1925a provided in a pair of hinges is relatively smaller than the other one. A small cylindrical portion 1925a is inserted in a large cylindrical portion 1924a. The ring plate 1924b of the upper hinge 1924 secures the front surface of the upper plate 1921 and the ring plate 1925b of the lower hinge 1925 secures the rear surface of the lower plate 1922. When the upper and lower plates 1921 and 1922 and the hinge portion 1923 are coupled to each other, the rotary unit 192 shown in FIG. 10 may be formed.

A hook 1925 projected from an end of the small cylindrical portion 1925 may be further provided to prevent the upper and lower hinges 1924 and 1925 from being separated from each other. Alternatively, a rib 1925b formed along an outer portion of the small cylindrical portion 1925a may be forcedly fitted to the large cylindrical portion 1924a, such that the upper hinge 1924 and the lower hinge 1925 may not be separated from each other. Also, the upper hinge 1924 and the lower hinge 1925 may be prevented from rotating separately, when the upper plate 1921 and the lower plate 1922 are rotated.

The rotary unit 192 shown in FIG. 10 is coupled to the module body 191 or the base body 193 by a screw 1929. FIG. 11 is a rear view illustrating the rotary unit 192 when the module body 191 of the mobile terminal 100 according to one embodiment of the present disclosure is rotated.

The upper plate 1921 is fixed to the module body 191 and the lower plate 1922 is secured to the base body 193 when the first and second coupling portions 1914 and 1934 are coupled to each other. In other words, when the upper plate 1021 and the lower plate 1922 are rotated with respect to the hinge portion 1923 as shown in FIG. 11, the module body 191 and the base body 193 may be rotated.

FIGS. 12, 13, 14 and 15 are diagrams illustrating the module body 191 of the mobile terminal 100 according to one embodiment of the present disclosure. FIG. 12 is an exploded perspective diagram and FIG. 13 is a diagram illustrating a coupling state of the module body. FIG. 14 is a rear view of a printed circuit board 185 and FIG. 15 is a sectional diagram illustrating a state where the module body 191 and the rotary unit 192 are coupled to each other.

The module body 191 may include a module case 1910, a display 151, a printed circuit board 185 and a window glass 1911. A pair of module cases 1910 may be provided to cover front and rear surfaces of the module body 191. In this embodiment, the rotary unit 192 may be coupled to the rear surface of the module body and the module case 1910 covering the rear surface can be omitted.

The window glass 1911 may be disposed in a front surface of the display 151 and a bezel 1912 may be formed by printing an opaque material on an edge portion of the display not to expose the edge portion to the user. As mentioned above, the bezel 1912 may be partially removed to form the function display unit 1913.

An auxiliary light source or display device may be provided as the function display unit 1913. Alternatively, the display 151 may be enlarged sufficiently as shown in FIG. 12 and the function display unit 1913 may be realized on the display 151.

A metallic shield can 186 may be provided to protect the devices mounted on the printed circuit board 185, while supporting the rear surface of the display 151, and to radiate the heat generated from the devices and the display 151. The shield can 186 shown in FIG. 12 may be an auxiliary member separated from the module case 1910 or the module case 1910 having a metallic portion and an injection mold portion may be formed in a double-injection molding process.

A connector 187 may be provided to connect elements arranged in the base body 193. Positions of holes formed in centers of the cylindrical portions 1924a and 1925a formed in the rotary unit 192 are not changed even when the rotary unit 192 is rotated. Accordingly, the connector 187 may be exposed to the rear surface via the central holes of the cylindrical portions 1924a and 1925a.

After inserting the connector 187 in a terminal formed in the printed circuit board 189 of the base body 193, the user may couple the first coupling portion 1914 to the second coupling portion 1934 and electrically connect electronic parts of the base body 193 with electronic parts of the module body 191.

The connector 187 may be formed as a hook, similar to the first coupling portion 1914. When the module body 191 slides to couple the first coupling portion 1914 to the second coupling portion 1934, the connector 187 may be inserted in the terminal of the base body 193.

Referring to FIG. 14, a wireless charging coil 131 may be arranged on a rear surface of the printed circuit board 185. When the wireless charging coil 131 is mounted on an electromagnetic field, electric currents flow to the wireless charging coil 131 and the wireless charging coil 131 is charged. In case a charging batter (not shown) is mounted in the module body 191, only the module body 191 may be separated and seated on a wireless charger to be charged.

Referring to FIGS. 16, 17, 18 and 19, the base body 193 will be described as follows. FIG. 16 is an exploded perspective diagram illustrating the base body 193 provided in the mobile terminal 100 according to one embodiment of the present disclosure. FIG. 17 is a sectional diagram and FIGS. 18 and 19 are plane views.

The base body 193 may include a base case 1930, a base cap 1931, a printed circuit board 189 and a strap. The strap 198 is connected to the base case 1930 and the base case 1930 provides a seating portion where the printed circuit board 189 of the base body 193 and various parts are mounted.

The base cap 1931 defines a front surface of the base body 193 and includes a second coupling portion 1934. A hole may be formed in the base cap to expose a terminal for inserting the connector 187 of the module body 191 therein, a speaker 152 or a rotation detecting sensor 148 which will be described later in detail.

The module case 1910 covering the rear surface of the module body 191 may be omitted because the rotary unit 192 is coupled to the module body 191. Similarly, when the rotary unit 192 is coupled to the base body 193, the base cap 1931 can be omitted.

In this embodiment, the rotary unit 192 is coupled to the module body 191 and the base body 193 having the base cap 1931 will be described. FIG. 18 is a diagram illustrating a state the base cap 1931 is coupled to the base case 1930. FIG. 19 is a plane view illustrating a state where the printed circuit board 189 is exposed to the front surface by separating the base cap 1931.

The base cap 1931 may include a plurality of holes. The terminal, the speaker and the rotation detecting sensor 148 mounted on the printed circuit board 189 are exposed via the holes formed in the base cap 1931. The speaker 152 may be arranged toward the front surface of the base module and it may further include a speaker cover 1932 in which a plurality of micro-holes are formed may be further provided to protect the speaker.

The module body 191 is not closely in contact with the base body and then sounds output from the speaker 152 may escape between the module body 191 and the base body 193. In case the mobile terminal is a necklace type shown in FIG. 25, not a watch type, the speaker 152 may be arranged to the rear surface.

As mentioned above, the terminal of the printed circuit board 189 may be exposed to the front surface and a fixing member may be provided in at least one of the second coupling portions. The fixing member 1935 is arranged via front and rear surfaces of the base body 193 and the portion where the fixing members 1935 are arranged may be omitted in the printed circuit board 189.

The base body 193 may be provided in various types including a watch type, a necklace type or a type having pincers or a clip which can be put on clothes or shoes. The user can wear the mobile terminal in various methods by replacing the base body 193. At this time, the module body 191 may recognize the type of the base body 193 and change an operational mode in accordance with the base body 193.

When the mobile terminal is put on a shoe or clothes, the mobile terminal may be used to record exercise. When the mobile terminal is the necklace type, the screen may be output to the display 151, without being affected in a right and left direction. The operational mode may be changed in accordance with the coupled base body 193 and use convenience may be enhanced.

The module body 191 detects an identifier of the base body 193 showing types of the base bodies 193. For example, when the connector 187 is inserted in the terminal of the base body 187, information on the type of the base module is transmitted to the module body 191 and the controller of the module body 191 may change the operational mode.

The rotation detecting sensor may be provided in the base module. Referring to FIGS. 20, 21, 22 and 23, the rotation detecting sensor 148 according to one embodiment of the present disclosure will be described.

The rotation detecting sensor provided in the base module may be a jog ball type or at least one of pressure, altitude and infrared sensors.

When the rotation detecting sensor 148 is mounted in the base body 193, a stopper 1927 may be formed in a rear surface of the upper plate 1921 coupled to the module body 191. The stopper 1927 means and recessed or projected portion spaced apart the same distance from the hinge portion 1923. The rotation detecting sensor 148 senses the stopper 1927 to determine whether to rotate. In other words, as shown in FIG. 21, the stopper 1927 spaced apart a predetermined angle and it is provided every 360/n°.

Only the recessed stopper 1927 may be provided or a recessed stopper 1927*a* and a projected stopper 1927*b* may be alternatively arranged. The rotation detecting sensor 148 may be provided in a predetermined portion of the lower plate 1922, corresponding to the lower plate 1922, spaced apart the same distance from the rotation unit 192. A sensor hole 1928 may be formed to sense the positions of the stoppers 1927*a* and 1927*b*.

The lower plate 1922 may be fixed to the base body 193 and the positions of the sensor hole 1928 and the rotation detecting sensor 148 are fixed. When the module body is rotated, the stopper 1927 is exposed via the sensor holes 1928 at every predetermined rotation angle as shown in FIG. 11.

The jog ball type rotation detecting sensor 148 exposed via the sensor hole 1928 has a ball 148*a* projected in a recess type stopper 1927*a* shown in FIG. 22*a* and a ball 148*a* recessed in a projected stopper 1927. The rotation detecting sensor 148 may generate a different signal in accordance with presence of projection or recession of the balls 148*a*, such that the rotation detecting sensor may sense whether the module body 191 is rotated.

When the recessed stopper 1927*a* is positioned in a front surface of the rotation detecting sensor 148, the rotation stops until the ball 148*a* is inserted in the recessed stopper 1927*a*. Accordingly, when recessed stoppers 1927*a* are arranged at intervals of 90 degrees as shown in FIG. 21, the rotation of the module body 191 may stop at intervals of 90 degrees. When the module body 191 stops the rotation, the function of the mobile terminal 100 mentioned above can be set to changed.

In the drawing, the stopper 1927 has the recessed stoppers 1927 arranged at intervals of 90 degrees. The intervals may be 60 degrees. In other words, the stoppers 1927*a* and 1927*b* may be formed at every 360/n°.

FIG. 23 shows that an infrared ray sensor or an altitude sensor is used as rotation detecting sensor 148, not the jog ball type rotation detecting sensor. When recessed or projected stoppers 1927 are positioned in the front surface of the rotation detecting sensor 148, the rotation detecting sensor 148 may senses change in altitudes of the upper plate to detect the rotation of the module body.

The rotation detecting sensor 148 may be provided in the base body 193 in this embodiment. However, it may be provided in the module body 191. When the rotation detecting sensor 148 is provided in the module body 191, stoppers may be formed in a front surface of the lower plate 1922 and the sensor holes 1928 may be formed in a front surface of the lower plate.

The hand operating the mobile terminal 100 can be differentiated in accordance with which wrist the mobile terminal 100 is put on. When the mobile terminal is put on the left arm, the right hand is used in operating the mobile terminal 100. When the mobile terminal 100 is put on the right arm, the left hand is used in operating the mobile terminal 100.

To enhance usability of the mobile terminal, the screen provided on the display 151 may be configured differently in accordance with a direction of the hand using the mobile terminal. In other words, when the mobile terminal 100 is put on the left arm, a screen of a right hand mode may be displayed on the display 151. When the mobile terminal 100 is put on the right arm, a screen of a left hand mode may be displayed on the display 151

A scroll index, a button and the like displayed on the screen are arranged on the left, in case the mode is a left hand mode. They are arranged in the right, in case the mode is a right hand mode. The conversion between the right hand mode and the left hand mode may be set by the user manually. However, the motion of the mobile terminal 100 may be sensed and it is determined which hand the mobile terminal 100 is put on. Based on the result of the determination, the mode may be converted into the left hand mode or the right hand mode automatically. The motion of the mobile terminal 100 may be sensed by the gyro sensor 143 and the acceleration sensor 144.

FIG. 24 is a diagram illustrating a wearing state of the mobile terminal 100 according to one embodiment of the present disclosure. FIGS. 24 (*a*) and (*b*) are diagrams illustrating a controller configured to determine which hand the mobile terminal is put on by sensing the motion of the right arm (a) and left arm (b).

As shown in FIG. 24, the arm put toward a direction of the gravity (x-axis direction) is moved in a perpendicular direction with respect t to the gravity direction to create an activation gesture. At this time, the controller 180 may determine that the mobile terminal is put on the right hand when the moving direction is (+) as shown in (a) and that the mobile terminal is put on the left hand when the moving direction is (−) as shown in FIG. (b).

The (+) direction means a direction which is perpendicular in a counter-clockwise direction with respect to the gravity direction (x-axis). The (−) direction means a direction which is a direction which is perpendicular in a clockwise direction with respect to the gravity direction (x-axis). It can be determined based on the motion of the mobile terminal 100 sensed by the sensor unit 140 whether the user wears the mobile terminal in the right hand or the left hand and the mode may be automatically changed into the left hand mode or the right hand mode.

As mentioned above, according to at least one of the embodiments, the module body and the base body are separable and various types of wearable mobile terminals can be realized.

Furthermore, the module body may be relatively rotated with respect to the base body. Accordingly, the functions of the mobile terminal can be converted and intuitive operation can be performed.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Mode for the Invention

As described above, a related description has sufficiently been discussed in the above Best Mode for implementation of the present invention.

INDUSTRIAL APPLICABILITY

As described above, the present invention may be wholly or partially applied to a display device.

The invention claimed is:

1. A mobile terminal comprising:
a base body wearable on a user's body;
a module body detachably coupled to the base body;
a rotary unit coupled to a rear surface of the module body or an upper surface of the base body, the rotary unit comprising a rotary hinge portion provided in a center of the rotary unit;
a first coupling portion and a second coupling portion provided at a rear surface of the rotary unit and a front surface of the base body or a front surface of the rotary unit and a rear surface of the module, body, respectively, the second coupling portion detachably coupled to the first coupling portion;
a controller configured to change a function based on a rotational angle of the rotary unit;
a printed circuit board arranged in the module case;
and a connector extended from the printed circuit board to be connected to the body,
wherein the rotary unit comprises, an upper plate provided in a rear surface of the module case, the upper plate
comprising a first hinge hole formed in a center thereof;
a lower plate provided below the upper plate, the lower plate comprising a second hinge hole formed in a center thereof;
and a hinge portion having a cylindrical portion penetrating the first hinge hole and the second hinge hole;
and wherein the connector is projected to a rear surface of the module body via the cylindrical portion.

2. The mobile terminal according to claim 1, wherein the first coupling portion is provided in the rear surface of the rotary unit, and
the second coupling portion is provided in the front surface of the base body, and
the mobile terminal further comprises a fixing member configured to fix the first coupling portion to prevent separation of the first coupling portion from the base body after coupled to the base body.

3. The mobile terminal according to claim 2, wherein the first coupling portion is a hook and the second coupling portion, is a hooking groove formed in the front surface of the base body to insert the hook therein, and
a cam is provided in one end of the fixing member to rotate to be in close contact with the hook after the hook is inserted in the hooking groove.

4. The mobile terminal according to claim 3, wherein a rotary plate is provided in the other end of the fixing member to be exposed to the rear surface of the base body to rotate the cam manually.

5. The mobile terminal according to claim 1, wherein the hinge portion comprises,
a lower hinge inserted in the second hinge hole from a rear surface of the lower plate; and
an upper hinge inserted in the first hinge hole from a front surface of the upper plate to be coupled to the lower hinge.

6. The mobile terminal according to claim 5, wherein each of the lower and upper hinges comprises,
the cylindrical portion; and
a ring plate provided in a front surface of the lower or upper plate.

7. The mobile terminal according to claim 5, wherein the cylindrical portion of the upper hinge is forcedly fitted to an outer or inner portion of the cylindrical portion of the lower hinge.

8. The mobile terminal according to claim 5, further comprising:
a hook projected from one end of the cylindrical portion arranged in an inner position,
wherein the cylindrical portion of the upper hinge is inserted to an outer or inner surface of the cylindrical portion of the lower hinge.

9. The mobile the terminal according to claim 1,
wherein the upper plate comprises a plurality of stoppers recessed or projected at predetermined intervals spaced apart the same distance from the hinge portion, and
a sensor hole is formed in the lower plate, spaced apart the same distance from the stoppers,
wherein the mobile terminal further includes a rotation detecting sensor detecting whether one of the plurality of stoppers is positioned the sensor hole.

10. The mobile terminal according to claim 9, wherein the rotation detecting sensor comprises at least one of a jog ball sensor, a pressure sensor, an altitude sensor and an infrared sensor.

11. The mobile terminal according to claim 1, further comprising;
a printed circuit board arranged in the module case; and
a wireless charging coil arranged in the module case.

12. The mobile terminal according to claim 1, wherein the position change of the function display unit is performed at every 360°/n of the module body rotation.

13. The mobile terminal according to claps 1, further comprising:
at least one of a hall sensor, a terrestrial magnetism sensor and an acceleration sensor.

14. The mobile terminal according to claim 1, wherein the body comprises at least one of:
a watch type base body comprising a band wearable on user's hand or arm;
a necklace type body comprising a strap wearable on the user's neck; and
a clip type base body comprising a clip inserted in a shoe or clothes.

15. The mobile terminal according to claim 1, farther comprising:
an operation sensor configured to sense an operation of the mobile terminal; and
a controller configured to provide a screen for a right hand mode to the display, when the operation sensor senses a perpendicular motion in an (+) direction with respect to a gravity direction in a state where the body is tilted for the display to be toward a lateral surface, and to provide a screen for a left hand mode to the display, when the operation sensor senses a perpendicular motion in a (−) direction with respect to the gravity direction in a state where the body is tilted for the display to be toward a lateral surface,
wherein the base body is a watch type base body comprising a band wearable on a user's hand or arm.

16. The mobile terminal according to claim 1, farther comprising
a controller configured to change a function based on a rotational angle of the rotary unit.

17. The mobile terminal according to claim 16, further comprising:
a bezel provided at an edge portion of the display; and
a function display unit output to the bezel,
wherein a position of the function display unit is changed to be displayed at relatively the same position in the body when the module body is rotated.

18. The mobile terminal according to claim 17, wherein the position change of the function display unit is performed at every 360°/n of the module body rotation.

* * * * *